United States Patent
Jeon et al.

(10) Patent No.: US 8,848,120 B2
(45) Date of Patent: Sep. 30, 2014

(54) LIQUID CRYSTAL LENS PANEL

(71) Applicant: LG Chem, Ltd., Seoul (KR)

(72) Inventors: Byoung Kun Jeon, Daejeon (KR); Su Young Ryu, Daejeon (KR); Moon Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/149,610

(22) Filed: Jan. 7, 2014

(65) Prior Publication Data

US 2014/0118646 A1    May 1, 2014

Related U.S. Application Data

(63) Continuation of application No. PCT/KR2013/001015, filed on Feb. 7, 2013.

(30) Foreign Application Priority Data

Feb. 7, 2012  (KR) .......................... 10-2012-0012106
Feb. 7, 2013  (KR) .......................... 10-2013-0014005

(51) Int. Cl.
  *G02B 7/22*    (2006.01)
  *G02B 3/14*    (2006.01)
  *G02F 1/1333*  (2006.01)
  *G02B 27/22*   (2006.01)

(52) U.S. Cl.
  CPC ................................... *G02B 27/225* (2013.01)
  USPC ............................................. 349/15; 349/200

(58) Field of Classification Search
  USPC ........................................ 349/15, 200; 428/1.1
  See application file for complete search history.

(56) References Cited

U.S. PATENT DOCUMENTS

| 7,365,809 | B2  |    | 4/2008  | Tanaka et al. |        |
|-----------|-----|----|---------|---------------|--------|
| 7,986,374 | B2  |    | 7/2011  | Ijzerman et al. |      |
| 8,279,362 | B2  | *  | 10/2012 | Yun et al. ..................... | 349/15 |
| 2009/0219475 | A1 |   | 9/2009  | Tseng et al. |         |
| 2013/0169913 | A1 | * | 7/2013 | Choi et al. ................. | 349/110 |
| 2013/0208196 | A1 | * | 8/2013 | Kim et al. ................... | 349/15 |

FOREIGN PATENT DOCUMENTS

| KR | 10-2003-0088244 | 11/2003 |
| KR | 10-205-0119140  | 12/2005 |
| KR | 10-2007-0082955 | 8/2007  |
| KR | 10-2011-0059169 | 6/2011  |
| KR | 10-2011-0078791 | 7/2011  |

* cited by examiner

*Primary Examiner* — Shean C Wu
(74) *Attorney, Agent, or Firm* — McKenna, Long & Aldridge, LLP (57) ABSTRACT

Provided is a liquid crystal lens panel. The illustrative liquid crystal lens panel may provide a display device capable of viewing a 3D or 2D image without glasses.

12 Claims, 4 Drawing Sheets

| UR | UL | UR | UL | UR |
|---|---|---|---|---|

Fig. 4

| UR | UL | UR | UL | UR |
|---|---|---|---|---|
| UL | UR | UL | UR | UL |
| UR | UL | UR | UL | UR |
| UL | UR | UL | UR | UL |
| UR | UL | UR | UL | UR |

LIQUID CRYSTAL LENS PANEL

CROSS-REFERENCE TO RELATED APPLICATION

This application is a Continuation Bypass of International Application PCT/KR2013/001015, with an international filing date of Feb. 7, 2013, which claims priority to and the benefit of Korean Patent Application No. 10-2012-0012106, filed Feb. 7, 2012 and Korean Patent Application No. 10-2013-0014005, filed Feb. 7, 2013, the disclosure of which is incorporated herein by reference in its entirety.

BACKGROUND

1. Field of the Invention

The present application relates to a liquid crystal lens panel.

2. Discussion of Related Art

Generally, a display device displays a two-dimensional image (hereinafter, referred to as "2D image"). Recently, according to increased demands for a three-dimensional image (hereinafter, referred to as "3D image") in the field of a game or movie, a display device displaying 3D images is being developed. A 3D image is recognized by inputting a pair of 2D images to both eyes of an observer and fusing the input images in the brain of the observer.

A 3D image display device (hereinafter, referred to as "3D device") may be classified into a stereo-scopic device and an auto stereo-scopic device. In the auto stereo-scopic device, a parallax barrier-type device disclosed in the patent document 1 or a lenticular lens-type device disclosed in the patent document 2 is generally used.

The patent document 1: Korean Patent Publ. No. 10-2005-0119140

The patent document 2: Korean Patent Publ. No. 10-2003-0088244

SUMMARY OF THE INVENTION

1. Technical Problem

The present application is directed to providing a liquid crystal lens panel.

2. Technical Solution

One aspect of the present application provides a liquid crystal lens panel including a lens layer. The lens layer may include a liquid crystal region formed of liquid crystal molecules.

The liquid crystal molecule in the liquid crystal region may exhibit a dielectric anisotropy ($\Delta\varepsilon \neq 0$). The term "dielectric anisotropy" used herein may refer to a characteristic of the liquid crystal molecule in which a permittivity measured in a major axis direction is different from that measured in a direction perpendicular to the major axis. In addition, when the term "vertical, parallel, perpendicular, or horizontal" is used to define an angle in the specification, it refers to substantially vertical, parallel, perpendicular, or horizontal without damaging a desired effect, including, for example, an error considering a production error or variation. For example, this term may include an error within approximately ±15, ±10, or ±5 degrees.

When the liquid crystal molecule has a dielectric anisotropy, according to voltage and strength thereof applied to the lens layer, alignment of the liquid crystal molecule may be changed. The dielectric anisotropy of liquid crystal molecule may have a positive or negative value. The sentence "the dielectric anisotropy of the liquid crystal molecule has a positive value" refers that the permittivity in the major axis direction of the liquid crystal molecule is higher than that in a minor axis direction thereof. In addition, the sentence "the dielectric anisotropy of the liquid crystal molecule has a negative value" refers that the permittivity in the major axis direction of the liquid crystal molecule is lower than that in a minor axis direction thereof. In one example, when the liquid crystal molecule has a positive dielectric anisotropy and a voltage is applied to the lens layer, the liquid crystal molecule may be rearranged in a direction of applying the voltage.

In one example, the region may be a region, which may be switched between a cholesteric alignment region and a non-cholesteric alignment region.

Figure 1:
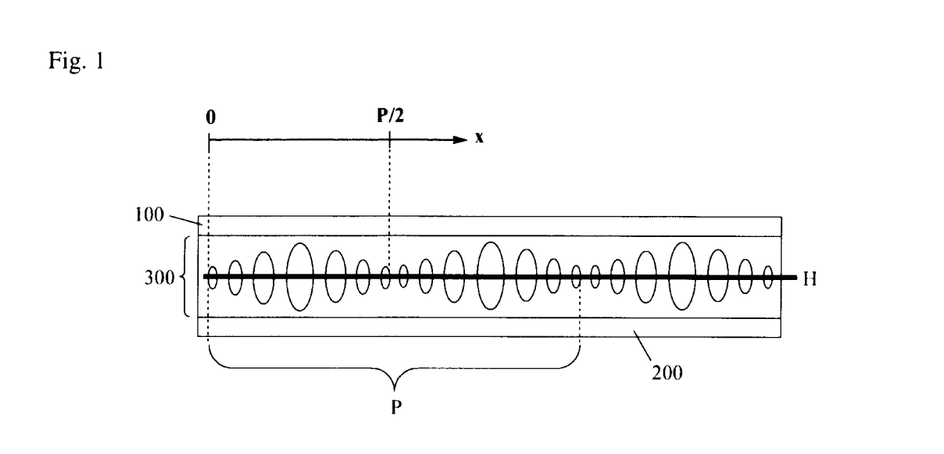
FIG. 1 is a schematic diagram of a cross-section of a illustrative cholesteric alignment region.

The cholesteric alignment region 300 may include, as shown in FIG. 1, cholesterically-aligned liquid crystal molecules. The cholesterically-aligned liquid crystal molecules form a helical structure by stacking the liquid crystal molecules in a layer and twisting directors of the liquid crystal molecule along a helical axis H. In the helical structure, a distance until the director of the liquid crystal molecule rotates a full 360 degrees refers to a pitch P.

Figure 2:
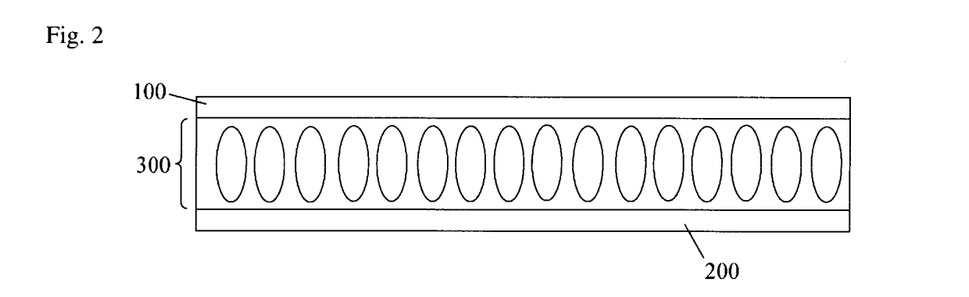
FIG. 2 shows a schematic diagram of a cross-section of an illustrative non-cholesteric alignment region.

At a specific point, when a suitable voltage is applied to the lens layer including the cholesteric alignment region, or the applied voltage is removed, the liquid crystal molecules may be arranged in one direction, and thus a cholesteric alignment state may be released. In addition, the cholesteric alignment is completely released, and thus all of the liquid crystal molecules in the liquid crystal region may be arranged in the same direction. The region including liquid crystal molecules in such a state may refer to the non-cholesteric alignment region. That is, the non-cholesteric alignment region 300 may be, as shown in FIG. 2, a region in which liquid crystal molecules are entirely vertical-aligned, parallel-aligned, or aligned at an angle between 0 to 90 degrees.

The cholesteric alignment region and the non-cholesteric alignment region may be switched by the application of a voltage. The region may be switched to form, for example, a cholesteric alignment region or non-cholesteric alignment region throughout the entire region. Accordingly, when a voltage is applied to the region, the same voltage may be applied to the entire region or a region to be rearranged alignment. As a result, a liquid crystal panel may be manufactured by a simple method since a method of patterning an electrode layer to realize both of optical anisotropy and isotropy may be omitted. In addition, the lens layer may be manufactured by a conventional method of manufacturing a liquid crystal panel.

In one example, the lens layer in a non-voltage applied state may include a cholesteric alignment region. When a voltage is applied to the lens layer in an extent to completely release the cholesteric alignment state, the cholesteric alignment region may be switched to a non-cholesteric alignment region. In addition, when the voltage applied to the lens layer including the non-cholesteric alignment region is removed, the region may be switched to the cholesteric alignment region.

The cholesteric alignment region may be a planar alignment region, a homeotropic alignment region, or a focal conic alignment region. The planar alignment region may be a region in which a helical axis of the region is perpendicular to a surface of the lens layer. The homeotropic alignment region may be a region in which a helical axis of the region is parallel to a surface of the lens layer. In addition, the focal conic alignment region may be a region in which a helical axis of the region is neither vertical nor horizontal to a surface of the lens layer. In one example, the cholesteric alignment region may be a homeotropic alignment region. The homeotropic alignment region may have a helical axis H formed to be parallel to a surface of the lens layer as shown in FIG. 1.

The homeotropic alignment region may have a periodical refractive index distribution with respect to linearly-polarized light perpendicular to the helical axis thereof. The region may have, for example, a refractive index distribution on a period of a ½ pitch. In one example, the region may have a refractive index distribution calculated by Equation 1.

$$n_{eff}(x) = n_e n_o / (n_e^2 \cos^2\theta(x) + n_o^2 \sin^2\theta(x))^{1/2}$$ [Equation 1]

In Equation 1, x is a coordinate of the cholesteric alignment region, which is an optional number between 0 to P/2. Here, P is a pitch of the cholesteric alignment region, $n_{eff}(x)$ is a refractive index of the cholesteric alignment region with respect to the linearly-polarized light at the x point, $n_e$ is an extraordinary refractive index of the liquid crystal molecule in the cholesteric alignment region, $n_o$ is an ordinary refractive index of the liquid crystal molecule in the cholesteric alignment region, and $\theta(x)$ is an angle of an optical axis of the liquid crystal molecule at a corresponding coordinate with respect to an optical axis of the liquid crystal molecule at the point at which x is 0.

Here, as shown in FIG. 1, x is a coordinate of the cholesteric alignment region in a direction parallel to a surface of the lens layer, which has a value of 0 to P/2. The "0" is a coordinate at a point from which a pitch of the cholesterically-aligned liquid crystal molecule starts, as shown in FIG. 1. In one example, the point from which the pitch starts may be a point at which the major axis of the liquid crystal molecule is formed parallel to the surface of the lens layer. P/2 is a coordinate at a point at which the cholesterically-aligned liquid crystal molecule is rotated 180 degrees.

Here, $\theta(x)$ is an angle of an optical axis of the liquid crystal molecule at a corresponding coordinate (x) with respect to an optical axis of the liquid crystal molecule at the point at which x is 0, and thus $\theta(0)$ is 0. In addition, since an optical axis of the liquid crystal molecule at the point at which x is P/4 is rotated 90 degrees from the optical axis of the liquid crystal molecule at the point at which x is 0, $\theta(P/4)$ is $\pi/2$. In addition, since the optical axis of the liquid crystal molecule at the point at which x is P/2 is rotated 180 degrees from the optical axis of the liquid crystal molecule at the point at which x is 0, $\theta(P/2)$ is $\pi$.

When $\theta(0)=0$, $\theta(P/4)=\pi/2$, and $\theta(P/2)=\pi$ are assigned to Equation 1, values of $n_{eff}(0)=n_{eff}(P/2)=n_o$ and $n_{eff}(P/4)=n_e$ may be obtained. That is, the cholesteric alignment region may have a refractive index distribution in which ordinary refractive indexes are obtained at 0 pitch and a ½ pitch (P/2), and an extraordinary refractive index is obtained at P/4. The "$n_{eff}(x)$" may be a refractive index measured at an x position with respect to linearly-polarized light, for example, having a wavelength of 550 nm and perpendicular to a helical axis of the region.

When the refractive index distribution of cholesteric alignment region at the ½ pitch is controlled according to Equation 1, the region may serve as a lenticular lens. Accordingly, as a liquid crystal lens panel is applied to, for example, an auto stereo-scopic 3D device, an image signal for a left eye and an image signal for a right eye may be split before emission.

In one example, the cholesteric alignment region may serve as a lens having a focal point distance (F) determined by Equation 2 of 0.1 mm to 100 cm, 0.1 mm to 70 cm, 0.1 mm to 50 cm, 0.1 mm to 30 cm, or 0.1 mm to 10 cm.

$$F = P^2 / (32 \times d \times \Delta n)$$ [Equation 2]

In Equation 2, P is a pitch of the cholesteric alignment region, d is a thickness of the lens layer, and Δn is a difference (ne−no) between an extraordinary refractive index (ne) and an ordinary refractive index (no) of the liquid crystal molecule in the cholesteric alignment region.

The focal point distance (F) may be a focal point distance with respect to, for example, linearly-polarized light perpendicular to the helical axis of the region. Such a focal point distance may be controlled, for example, in consideration of a watching distance of a 3D device. In addition, to control the focal point distance (F), a pitch or double refractive index of the cholesteric alignment region, or a thickness of the lens layer may be controlled.

The pitch of the cholesteric alignment region may be suitably controlled, for example, in consideration of a pixel size of a display element of a 3D device. In one example, the pitch of the cholesteric alignment region may be controlled to be approximately 0.1 µm to 10 cm, 0.1 µm to 5 cm, 0.1 µm to 3 cm, 0.1 µm to 1 cm, 0.1 µm to 5000 µm, or 0.1 µm to 3000 µm. When the pitch is controlled in the above range, image signals for right and left eyes delivered from the display element may be split through the liquid crystal lens panel before emission.

In addition, to provide an auto stereo-scopic 3D device for watching a 3D image at a suitable distance without glasses, the difference ($n_e-n_o$) between an extraordinary refractive index ($n_e$) and an ordinary refractive index ($n_o$) of the liquid crystal molecule in the cholesteric alignment region may be controlled in a range from 0.01 to 0.6, 0.1 to 0.6, or 0.01 to 0.5. In addition, to ensure a suitable watching distance of the auto stereo-scopic 3D device, the thickness of the lens layer may be controlled to be 0.1 to 100 µm, 0.1 to 50 µm, 0.1 to 30 µm, or 0.1 to 10 µm.

The liquid crystal lens panel may further include a base layer, one surface of which has an electrode layer. Moreover, the lens layer may be disposed in contact with the electrode layer of the base layer.

In one example, the liquid crystal lens panel may include two base layers 100 and 200 facing each other, as shown in FIGS. 1 and 2. On one surface of at least one of the two base layers, an electrode layer is present, and the lens layer 300 may be disposed between the base layers facing each other to be in contact with the electrode layer. Any one of the two base layers is referred to as a first base layer 100, and the other one may be referred to as a second base layer 200. The two base layers may use the same base material or different base materials.

As the base layer, a base layer conventionally used to manufacture a liquid crystal lens panel may be used without limitation. As the base layer, for example, a glass base layer or a plastic base layer may be used. The plastic base layer may be a sheet or film including, for example, a cellulose resin such as triacetyl cellulose (TAC) or diacetyl cellulose (DAC); a cyclic olefin polymer (COP) such as a norbornene derivative; a cyclic olefin copolymer (COC); an acryl resin such as poly (methyl methacrylate) (PMMA); polycarbonate (PC); polyolefin such as polyethylene (PE) or polypropylene (PP); polyvinyl alcohol (PVA); poly ether sulfone (PES); polyetheretherketone (PEEK); polyetherimide (PEI); polyethylenenaphthalate (PEN); polyester such as polyethyleneterephthalate (PET); polyimide (PI); polysulfone (PSF); or a fluorine resin. The plastic base layer may be optically isotropic or anisotropic.

The base layer may include a UV blocking agent or a UV absorbent. When the UV blocking agent or absorbent is included in the base layer, deterioration of the lens layer due to a UV ray may be prevented. The UV blocking agent or absorbent may be an organic material such as a salicylic acid ester compound, a benzophenone compound, an oxybenzophenone compound, a benzotriazol compound, a cyanoacrylate compound, or a benzoate compound, or an inorganic material such as a zinc oxide or a nickel complex salt. A content of the UV blocking agent or absorbent in the base layer is not particularly limited and may be suitably selected in consideration of a desired effect. For example, in the manufacturing process for the plastic base layer, the UV blocking agent or absorbent may be included in a weight ratio of approximately 0.1 to 25 wt % with respect to a weight ratio of a main component of the base layer.

A thickness of the base layer is not particularly limited and may be suitably controlled according to a desired use. The base layer may have a monolayered or multilayered structure.

As the electrode layer present on one surface of the base layer, a transparent conductive electrode such as indium tin oxide (ITO) may be used.

The liquid crystal lens panel may further include an alignment layer between the base layer and the lens layer. As the alignment layer, a conventional alignment layer known in the art, for example, a photo-alignment layer, a (nano) imprinting-type alignment layer, or a rubbing alignment layer may be used. The alignment layer is an optional component, which may provide an aligning property to the base layer without an alignment layer by directly rubbing it on the base layer or stretching the base layer.

In one example, when the cholesteric alignment region is a homeotropic alignment region, the alignment layer may be a vertical alignment layer. The vertical alignment layer may be an alignment layer capable of providing an aligning property to align adjacent liquid crystal molecules in a direction perpendicular to a surface of the vertical alignment layer.

The liquid crystal lens panel may be formed by a method known in the related art to satisfy the above-described condition. The panel may be manufactured by forming a lens layer, for example, by disposing two base layers facing each other such that the base layer faces an electrode layer, injecting a liquid crystal composition between the two base layers, and performing alignment.

The liquid crystal composition may include all kinds of compositions which may be used to form the cholesteric alignment region.

In one example, the composition may include nematic liquid crystal molecules and a chiral agent. The nematic liquid crystal molecules are usually aligned in a long axis direction in a state in which the molecules are aligned at irregular positions without forming a layer. As the chiral agent is added to the nematic liquid crystal molecules, a desired helical pitch may be induced. Here, the helical pitch may be controlled according to Equation 3.

$$P = 1/P_t \cdot c \qquad \text{[Equation 3]}$$

In Equation 3, $P_t$ is a twisting power of the chiral agent, and c is a mole concentration of the chiral agent. Accordingly, when a chiral agent having a high twisting power is used or a content of a chiral agent is increased, a pitch of a chiral nematic liquid crystal molecule may become shorter.

The nematic liquid crystal molecule may be any one used in the related art without limitation. For example, as the liquid crystal molecule, a compound represented by Formula 1 may be used.

[Formula 1]

In Formula 1, A is a single bond, —COO—, or —OCO—, $R_1$ to $R_{10}$ are each independently hydrogen, a halogen, an alkyl group, an alkoxy group, an alkoxycarbonyl group, a cyano group, a nitro group, —U-Q-P, or a substituent of Formula 2, or a pair of two adjacent substituents of $R_1$ to $R_5$ or a pair of two adjacent substituents of $R_6$ to $R_{10}$ are linked to each other, thereby forming the benzene substituted with —U-Q-P. Here, U is —O—, —COO—, or —OCO—, Q is an alkylene group or an alkylidene group, and P is an alkenyl group, an epoxy group, a cyano group, a carboxyl group, an acryloyl group, a methacryloyl group, an acryloyloxy group or a methacryloyloxy group.

[Formula 2]

In Formula 2, B is a single bond, —COO—, or —OCO—, $R_{11}$ to $R_{15}$ are each independently hydrogen, a halogen, an alkyl group, an alkoxy group, an alkoxycarbonyl group, a cyano group, a nitro group, or —U-Q-P. Here, two adjacent substituents of $R_{11}$ to $R_{15}$ are linked to each other, thereby forming a benzene substituted with —U-Q-P. Here, U is —O—, —COO—, or —OCO—, Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

In Formulas 1 and 2, the sentence "two adjacent substituents are linked to each other, thereby forming a benzene substituted with —U-Q-P" may refer that the two adjacent substituents are linked to each other, thereby forming a naphthalene backbone overall substituted with —U-Q-P.

In Formula 2, the mark on the left of B may refer that B is directly linked to a benzene of Formula 1.

In Formulas 1 and 2, the term "single bond" refers that there is no separate atom at a part represented as A or B. For example, in Formula 1, when A is a single bond, benzenes at both ends of A may be directly linked, thereby forming a biphenyl structure.

In Formulas 1 and 2, as a halogen, fluorine, chlorine, bromine, or iodine may be used.

The term "alkyl group" used herein may be, unless specifically defined otherwise, a linear or branched alkyl group having 1 to 20, 1 to 16, 1 to 12, 1 to 8, or 1 to 4 carbon atoms, or a cycloalkyl group having 3 to 20, 3 to 16, or 4 to 12 carbon atoms. The alkyl group may be optionally substituted with at least one substituent.

The term "alkoxy group" used herein may be, unless specifically defined otherwise, an alkoxy group having 1 to 20, 1 to 16, 1 to 12, 1 to 8, or 1 to 4 carbon atoms. The alkoxy group may be a linear, branched, or cyclic type. In addition, the alkoxy group may be optionally substituted with at least one substituent.

In addition, the term "alkylene or alkylidene group" used herein may be, unless specifically defined otherwise, an alkylene or alkylidene group having 1 to 12, 4 to 10, or 6 to 9 carbon atoms. The alkylene or alkylidene group may be a linear, branched, or cyclic type. In addition, the alkylene or alkylidene group may be optionally substituted with at least one substituent.

In addition, the term "alkenyl group" used herein may be, unless specifically defined otherwise, an alkenyl group having 2 to 20, 2 to 16, 2 to 12, 2 to 8, or 2 to 4 carbon atoms. The alkenyl group may be a linear, branched, or cyclic type. In addition, the alkenyl group may be optionally substituted with at least one substituent.

In one example, in Formulas 1 and 2, P may be an acryloyl group, a methacryloyl group, an acryloyloxy group, or a methacryloyloxy group.

In Formulas 1 and 2, when the —U-Q-P or moiety of Formula 2 is included, one or two —U-Q-Ps or moieties of Formula 2 may be present at, for example, a position of $R_1$, $R_8$, or $R_{13}$. In addition, in the compound of Formula 1 or the moiety of Formula 2, a substituent, other than the —U-Q-P or the moiety of Formula 2, may be, for example, hydrogen, a halogen, a linear or branched alkyl group having 1 to 4 carbon atoms, a cycloalkyl group having 4 to 12 carbon atoms, a cyano group, an alkoxy group having 1 to 4 carbon atoms, or a nitro group. In another example, a substituent other than the —U-Q-P or the moiety of Formula 2 may be chlorine, a linear or branched alkyl group having 1 to 4 carbon atoms, a cycloalkyl group having 4 to 12 carbon atoms, an alkoxy group having 1 to 4 carbon atoms, or a cyano group.

In the specification, a substituent which may be substituted to a specific compound or functional group may be, but is not limited to, an alkyl group, an alkoxy group, an alkenyl group, an epoxy group, an oxo group, an oxetanyl group, a mercapto group, a cyano group, a carboxyl group, an acryloyl group, a methacryloyl group, an acryloyloxy group, a methacryloyloxy group, or an aryl group.

Here, as a chiral agent, any one capable of inducing a desired helical pitch without damaging to crystallinity of the liquid crystal, for example nematic regularity, may be used without particular limitation. The chiral agent for inducing the helical pitch to the liquid crystal is necessary to include at least chirality in a molecular structure. As the chiral agent, for example, a compound having one or at least two asymmetric carbons, a compound having an asymmetric point on a hetero atom such as a chiral amine or chiral sulfoxide, or a compound having an axially asymmetric and optically active site having an axial member such as cumulene or binaphthol may be used. The chiral agent may be, for example, a low molecular compound having a molecular weight of 1,500 or less. For example, as the chiral agent, a commercially-available chiral nematic liquid crystal, for example, a chiral dopant liquid crystal such as S-811 available from Merck or LC756 available from BASF may be used.

The chiral agent may be used in a ratio of 1 to 10 parts by weight with respect to 100 parts by weight of the compound of Formula 1. As the content of the chiral agent is controlled as described above, helical twisting of the cholesteric alignment region may be effectively induced. Unless specifically defined otherwise in the specification, the unit "parts by weight" may refer to a weight ratio.

The cholesterically-aligned liquid crystal composition may be typically a part of a coating composition including at least one solvent. Examples of the solvents may include, for example, halogenated hydrocarbons including chloroform, dichloromethane, tetrachloroethane, trichloroethylene, tetrachloroethylene, and chlorobenzene; aromatic hydrocarbons including benzene, toluene, xylene, methoxy benzene, and 1,2-dimethoxybenzene; alcohols including methanol, ethanol, propanol, and isopropanol; ketones including acetone, methylethylketone, methylisobutylketone, cyclohexanone, and cyclopentanone; cellosolves including methylcellosolve, ethylcellosolve, and butylcellosolve; and ethers including diethyleneglycol dimethylether (DEGDME) and dipropyleneglycol dimethylether (DPGDME). In addition, the content of the solvent is not particularly limited and may be suitably selected in consideration of coating efficiency or drying efficiency.

In the liquid crystal composition or a coating composition including the same, in addition to the above-described components, a polymerizable monomer, a polymer, a dispersing agent, an initiator, a crosslinking agent, a surfactant, an antioxidant, or an ozone inhibitor may be further blended without interfering alignment of the liquid crystal molecule. In addition, the coating composition may include various dyes and pigments to absorb UV rays, IR rays, or visible rays if wanted. In some cases, it may be preferable that tackifiers such as a thickening agent and a filler are included.

The cholesterically-aligned liquid crystal composition may be injected between the two base layers by, for example, various methods of injecting a liquid. In addition, the liquid crystal molecules of the injected liquid crystal composition may be aligned, thereby forming the lens layer. The alignment of the liquid crystal molecules may be performed by, for example, the above-described alignment layer.

The liquid crystal lens panel may serve to rearrange the alignment of the liquid crystal molecules by the application of a voltage. In one example, as show in FIG. 1, in the state in which the lens layer includes the cholesteric alignment region, light transmitted through the region may be split according to a position of incident light before emission. In another example, as shown in FIG. 2, in a state in which the lens layer includes a non-cholesteric alignment region, light transmitted through the region may be emitted as it is regardless of a position of incident light. The liquid crystal lens panel which may act as described above may be applied to a display device capable of displaying both 2D and 3D images.

Figure 5:
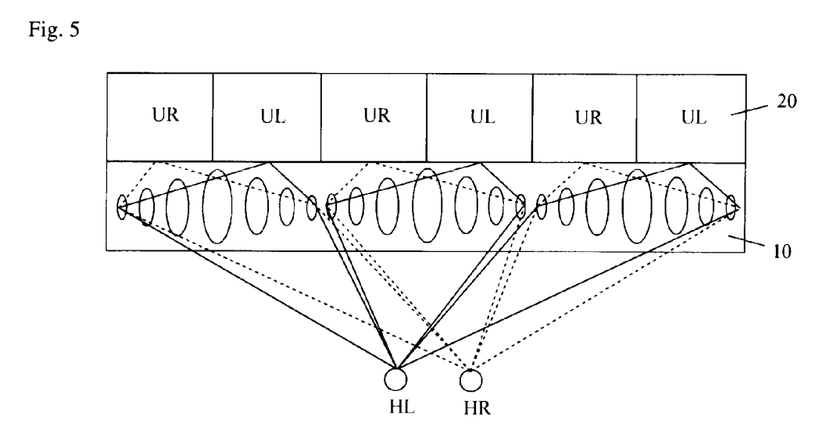
FIG. 5 is a schematic diagram showing a driving state of an illustrative display device to project a 3D image.
Figure 6:
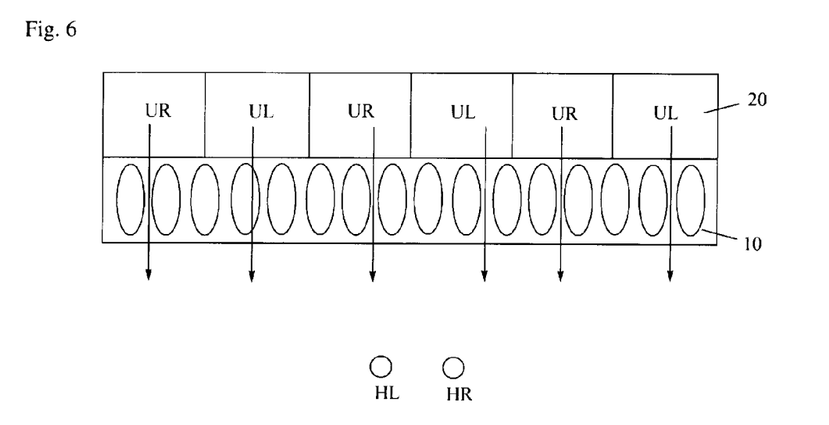
FIG. 6 is a schematic diagram showing a driving state of an illustrative display device to project a 2D image.

As shown in FIG. 5 or 6, the device may include a display element 20 and a liquid crystal lens panel 10. In addition, the device may further include a polarizer between the display element and liquid crystal lens panel. Moreover, the device may further include a polarizer and a light source, which are sequentially disposed on an opposite side of the liquid crystal lens panel of the display element. Hereinafter, in the specification, for convenience of description, the polarizer disposed between the light source and the display element is referred to as a first polarizer, and the polarizer disposed on an opposite side of the first polarizer is referred to as a second polarizer.

The first and second polarizers included in the device are optical elements having a transmission axis and an absorption axis perpendicular to the transmission axis. When light is incident on the polarizer, the polarizer may transmit only light having a polarization axis parallel to the transmission axis of the polarizer among incident lights.

In one example, the absorption axis of the first polarizer and the absorption axis of the second polarizer included in the device may be perpendicular to each other. In this case, the transmission axes of the first and second polarizers may also be perpendicular to each other.

As a light source, a direct or edge-type back light unit (BLU) conventionally used in a liquid crystal display (LCD) may be used. Other than that, various kinds of light sources may be used without limitation.

The display element of the device may generate image signals in a driving state, for example, image signals including an image signal (hereinafter, referred to as "R signal") for a right eye and an image signal (hereinafter, referred to as "L signal") for a left eye. In one example, the display element may include a region (hereinafter, referred to as "UR region") of generating the R signal capable of generating a 2D image signal or the R signal, and a region (hereinafter, referred to as "UL region") of generating the L signal capable of generating a 2D image signal or the L signal in a driving state. However, in the display element, the regions of generating image signals are referred to as the UR and UL regions, but as will be described below, the display element may generate a 2D image signal regardless of a name of the region.

The display element may be, for example, a region including a transparent liquid crystal panel or a region formed by a liquid crystal layer of the liquid crystal panel. The transparent liquid crystal panel may include, for example, a first substrate, a pixel electrode, a first alignment layer, a liquid crystal layer, a second alignment layer, a common electrode, and a second substrate, which are sequentially disposed from the side of the light source. For example, an active drive circuit including a thin film transistor (TFT) and an interconnection may be formed on the first substrate on the side of the light source as a drive element electrically connected to a transparent pixel electrode. The pixel electrode may include, for example, ITO, and serve as an electrode by pixels. In addition, the first or second alignment layer may include, for example, a material such as polyimide. The liquid crystal layer may include, for example, a vertical alignment (VA), twisted nematic (TN), super twisted nematic (STN), or in plane switching (IPS)-mode liquid crystal. The liquid crystal layer may serve to transmit or block light emitted from the light source by pixels due to a voltage applied from the drive circuit. The common electrode may include, for example, ITO, and serve as a common counter electrode.

The display element may include the UR and UL regions formed by at least one pixel. For example, in the liquid crystal panel, the UR or UL region may be formed using a unit pixel including a liquid crystal sealed between the first and second alignment layers or a combination of at least two unit pixels.

Figure 3:
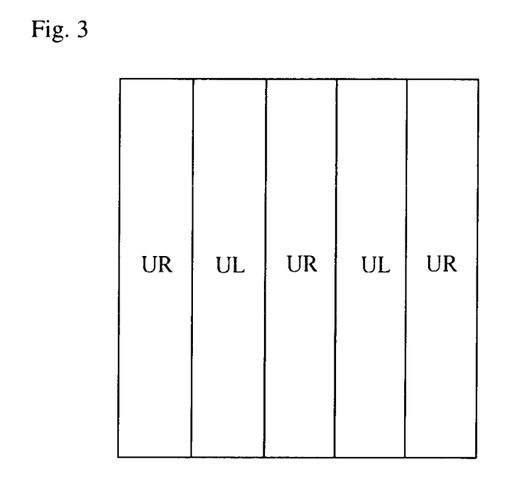
FIGS. 3 and 4 show illustrative arrangements of UR and UL regions.
Figure 4:
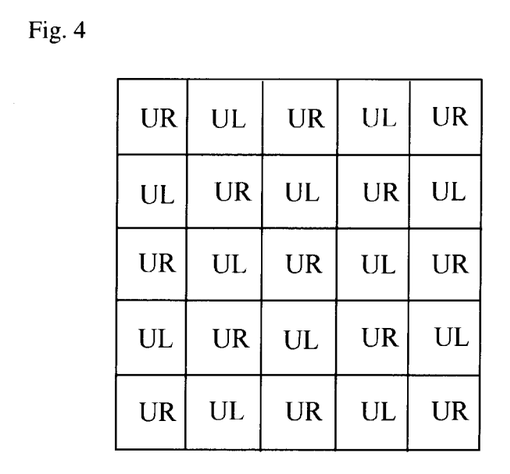

The UR and UL regions may be disposed in column and/or row direction(s). FIG. 3 is a diagram showing illustrative arrangement of the UR and UL regions. As shown in FIG. 3, the UR and UL regions may have a stripe shape extending in a common direction, and may be adjacently and alternately arranged. FIG. 4 shows another illustrative arrangement, in which UR and UL regions are arranged adjacently and alternately in a lattice pattern. The arrangement of the UR and UL regions is not limited to the arrangements shown in FIGS. 3 and 4, and thus all of various designs known in the art may be applied.

The display element may generate a 2D image signal or image signals including R and L signals by driving pixels in each region according to a signal in a driving state.

As an example, an operation in which the display element generates image signals including R and L signals in the device will be explained. For example, when light emitted from the light source is incident on a first polarizer, only light polarized parallel to a transmission axis of the first polarizer is transmitted through the first polarizer. After the transmitted light is incident on the display element, the light transmitted through an UR region may become an R signal, and the light transmitted through an UL region may become an L signal. When the R and L signals are incident on a second polarizer, only a signal polarized parallel to a transmission axis of the second polarizer may be incident on a liquid crystal lens panel through the second polarizer. In one example, the polarized signal incident on the liquid crystal lens panel through the second polarizer may be a linearly-polarized signal. In addition, the linearly-polarized signal may be polarized in a direction perpendicular to a helical axis of the cholesteric alignment region of the liquid crystal lens panel and then incident on the liquid crystal lens panel.

In another example, an operation in which a display element generates a 2D image signal in a device will be explained. For example, when light emitted from the light source is incident on the first polarizer, only light polarized parallel to the transmission axis of the first polarizer is transmitted through the first polarizer. After the transmitted light is incident on the display element and generates a 2D image signal, both of the light transmitted through an UR region and the light emitted through an UL region may become the same 2D image signals. When the generated 2D image signals are incident to the second polarizer, only a signal polarized parallel to the transmission axis of the second polarizer may be transmitted through the second polarizer and then incident on the liquid crystal lens panel.

As described in FIGS. 5 and 6, the liquid crystal lens panel may be arranged to transmit light delivered from the display element. In addition, as shown in FIG. 5, the liquid crystal lens panel may be arranged such that a ½ pitch of the cholesteric alignment region corresponds to a pair of the UR and UL regions of the display element. The arrangement to correspond the ½ pitch of the cholesteric alignment region to the pair of the UR and UL regions refers to arrangement of image signals generated in the pair of the UR and UL regions to be incident in a ½ pitch of the cholesteric alignment region, not necessarily referring that ½ pitches of the pair of the UR and UL regions and the cholesteric alignment region are formed at the same position in the same size.

The liquid crystal lens panel may exhibit optical anisotropy and isotropy according to the application of a voltage, with respect to linearly-polarized light perpendicular to the helical axis of the cholesteric alignment region. Accordingly, by the application of a voltage to the liquid crystal lens panel, the device may project a 2D image or a 3D image.

An operation in which the device is driven to project a 3D image will be explained. As shown in FIG. 5, in the state in which the device projects a 3D image, the liquid crystal lens panel 10 may include a cholesteric alignment region in the state of projecting a 3D image. In addition, the signal transmitted through the second polarizer may be polarized perpendicular to the helical axis of the region to be incident to the liquid crystal lens panel. Accordingly, the R and L signals generated in the UR and UL regions of the display element 20 may be emitted in a different direction by being split in the cholesteric alignment region. In one example, as shown in FIG. 5, the R signal generated in the UR region and the L signal generated in the UL region may be split through the cholesteric alignment region. In addition, the R signal transmitted through the region is incident to the right eye (HR) of an observer, and the L signal transmitted through the liquid crystal region is incident to the left eye (HL) of the observer. Accordingly, the observer may observe the 3D image without wearing special glasses, for example, shutter glass-type glasses or polarizing glasses.

An operation in which the device is driven to project a 2D image will be explained. As shown in FIG. 6, in the state in which the display element 20 projects a 2D image, the liquid crystal lens panel 10 may include a non-cholesteric alignment region. That is, in the driving state to project a 2D image, the liquid crystal lens panel may include a region having optical isotropy with respect to linearly polarized light perpendicular to the helical axis of the cholesteric alignment region. Accordingly, 2D image signals generated in the UR and UL regions of the display element 20 may transmit an isotropic region as they are. As a result, the observer may observe a 2D image.

The device may be realized by employing a configuration and a method, which are conventionally used in the related art, except that it may display both a 2D image and a 3D image using the liquid crystal lens panel.

3. Effect of the Invention

An illustrative liquid crystal lens panel of the present application can provide a display device for viewing a 3D or 2D image without glasses.

DETAILED DESCRIPTION OF EXEMPLARY EMBODIMENTS

Hereinafter, a liquid crystal lens panel and a display device will be described in detail with reference to Example, but the panel and device are not limited to the following Example.

Example (1) Preparation of Cholesteric Alignment Liquid Crystal Composition

As a cholesteric alignment liquid crystal composition, a composition including a liquid crystal molecule having a difference ($n_e$–$n_o$) between an extraordinary refractive index ($n_e$) and an ordinary refractive index ($n_o$) of approximately 0.2 was used.

(2) Manufacture of Liquid Crystal Lens Panel and Display Device

A liquid crystal lens panel was manufactured using an electrode substrate (a base layer, one surface of which has an electrode layer) in which a vertical alignment layer, which was generally used to manufacture a liquid crystal panel, was formed. Specifically, the liquid crystal lens panel was manufactured by disposing two substrates including the electrode substrate to face each other at an interval of approximately 4.1 μm, injecting the cholesteric alignment liquid crystal composition through a conventional liquid crystal injection method, and performing cholesteric alignment.

A lens layer of the liquid crystal lens panel included a cholesteric alignment region homeotropically-aligned in a state in which a voltage is not applied as shown in FIG. 1. A pitch (P) of the cholesteric alignment region was approximately 600 μm, and a thickness of the lens layer 300 was approximately 4.1 μm. Since liquid crystal molecules had a dielectric anisotropy, when a voltage was applied, according to the applied voltage, the liquid crystal molecules were arranged in one direction, thereby forming a liquid crystal region not cholesterically-aligned as shown in FIG. 2. The manufactured liquid crystal lens panel was applied to a conventional lenticular lens-type 3D device as a lenticular lens, thereby manufacturing a display device.

Experimental Example

Whether an observer could view a 3D image without special glasses, when the liquid crystal lens panel included a homeotropically-aligned cholesteric alignment region in the display device, was evaluated by the following method.

Figure 7:
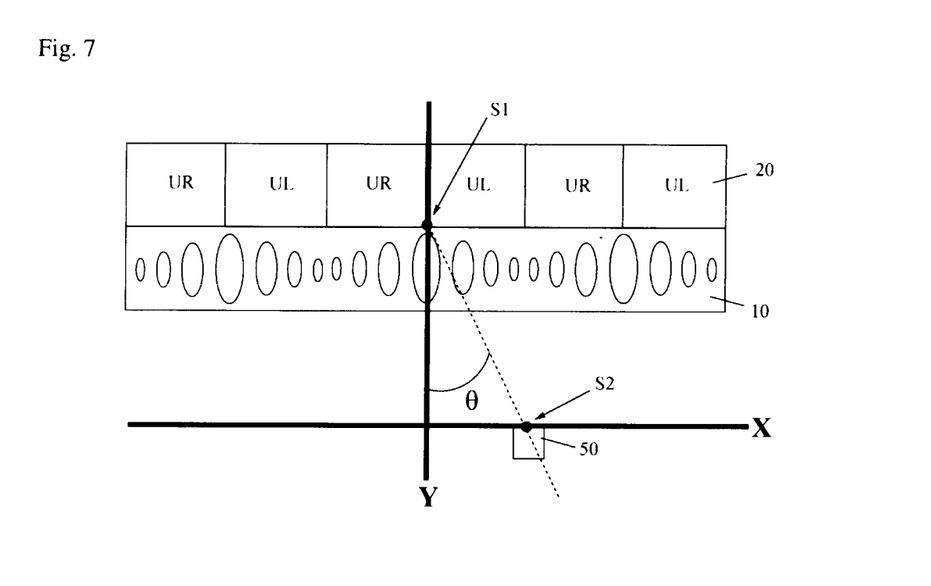
FIG. 7 is a diagram illustrating a method of evaluating whether a display device splits L and R signals before emission according to Example.

First, as shown in FIG. 7, a luminance meter (SR-UL2 Spectrometer, 50) was disposed at an observation point (an optional point in contact with an X line of FIG. 7) at which the display device could be observed. Subsequently, while the device was set to output an L signal, a luminance was measured using the luminance meter. A luminance in each case was measured while the luminance meter 50 was kept a distance away from the device and moved in a direction parallel to the X line of FIG. 7. In each case, a luminance was measured and then defined as an intensity of the L signal at each point. Likewise, a luminance was measured by moving the luminance meter while the device was set to output an R signal. In addition, the luminance was defined as an intensity of the R signal at the point.

Figure 8:
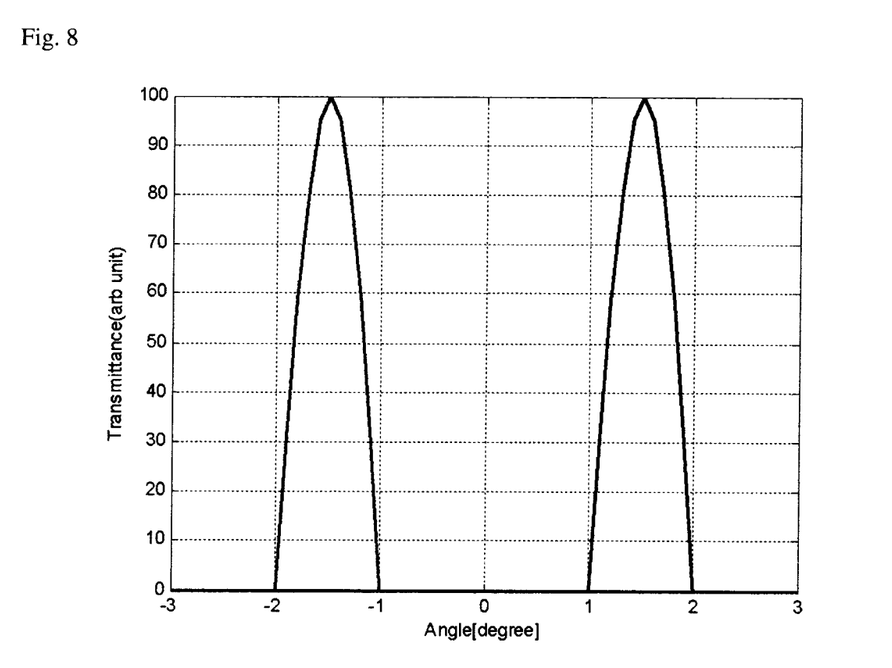
FIG. 8 is a graph showing that a display device splits L and R signals before emission according to Example.

The intensities of the L and R signals at each point are shown in Table 1 and FIG. 8.

In Table 1, a measurement angle (θ) was defined as an angle between a virtual line connecting a point S1 at which a Y line was in contact with a surface of the display element to a point S2 of a center of the luminance meter, and the Y line in FIG. 7. In addition, when the luminance meter was present on the right of the Y line, the measurement angle was defined as a positive value, and when the luminance meter was present on the left of the Y line, the measurement angle was defined as a negative value. Here, the Y line may be defined as a normal line with respect to a surface of the device, passing through the center of the device.

TABLE 1

| Measurement Angle (Unit: Degrees) | Intensity of L Signal [a] | Intensity of R Signal [b] |
|---|---|---|
| −3 | 0 | 0 |
| −2.9 | 30.9017 | 0 |
| −2.8 | 58.7785 | 0 |
| −2.7 | 80.9017 | 0 |
| −2.6 | 95.1057 | 0 |
| −2.5 | 100 | 0 |
| −2.4 | 95.1057 | 0 |
| −2.3 | 80.9017 | 0 |

TABLE 1-continued

| Measurement Angle (Unit: Degrees) | Intensity of L Signal [a] | Intensity of R Signal [b] |
|---|---|---|
| −2.2 | 58.7785 | 0 |
| −2.1 | 30.9017 | 0 |
| −2 | 0 | 0 |
| 2 | 0 | 0 |
| 2.1 | 0 | 30.9017 |
| 2.2 | 0 | 58.7785 |
| 2.3 | 0 | 80.9017 |
| 2.4 | 0 | 95.1057 |
| 2.5 | 0 | 100 |
| 2.6 | 0 | 95.1057 |
| 2.7 | 0 | 80.9017 |
| .8 | 0 | 58.7785 |
| 2.9 | 0 | 30.9017 |
| 3 | 0 | 0 |

[a, b] The intensities of the L and R signals are relative intensities if the intensity of a signal at a point at which the maximum luminance is measured is set to 100.

What is claimed is:

1. A liquid crystal lens panel, comprising: a lens layer comprising a liquid crystal region formed of liquid crystal molecules,
   wherein the liquid crystal region is convertable between a homeotropically-aligned cholesteric alignment region having a focal distance (F) according to Equation 2 of 0.1 mm to 100 cm, and a non-cholesteric alignment region:

$$F = P^2/(32 \times d \times \Delta n) \quad \text{[Equation 2]}$$

where P is a pitch of the cholesteric alignment region, d is a thickness of the lens layer, and $\Delta n$ is a difference $(n_e - n_o)$ between an extraordinary refractive index $(n_e)$ and an ordinary refractive index $(n_o)$ of the liquid crystal molecule.

2. The liquid crystal lens panel according to claim 1, wherein the cholesteric alignment region has a refractive index distribution according to Equation 1 with respect to linearly-polarized light perpendicular to a helical axis thereof:

$$n_{\mathit{eff}}(x) = n_e n_o / (n_e^2 \cos^2\theta(x) + n_o^2 \sin^2\theta(x))^{1/2} \quad \text{[Equation 1]}$$

where x is a coordinate of the cholesteric alignment region, which is an optional number between 0 to P/2, P is a pitch of the cholesteric alignment region, $n_{\mathit{eff}}(x)$ is a refractive index of the cholesteric alignment region with respect to the linearly-polarized light at an x point, $n_e$ is an extraordinary refractive index of the liquid crystal molecule, $n_o$ is an ordinary refractive index of the liquid crystal molecule, and $\theta(x)$ is an angle of an optical axis of the liquid crystal molecule at a corresponding coordinate with respect to an optical axis of the liquid crystal molecule at the point at which x is 0.

3. The liquid crystal lens panel according to claim 1, wherein the pitch of the cholesteric alignment region is 0.1 µm to 10 cm.

4. The liquid crystal lens panel according to claim 1, wherein the liquid crystal molecule has a difference $(n_e - n_o)$ between an extraordinary refractive index $(n_e)$ and an ordinary refractive index $(n_o)$ of 0.01 to 0.6.

5. The liquid crystal lens panel according to claim 1, wherein the thickness of the lens layer is 0.1 to 100 µm.

6. The liquid crystal lens panel according to claim 1, wherein the liquid crystal molecule has a positive or negative dielectric anisotropy.

7. The liquid crystal lens panel according to claim 1, further comprising:
   a base layer, one surface of which has an electrode layer, wherein the lens layer is disposed in contact with the electrode layer of the base layer.

8. The liquid crystal lens panel according to claim 7, further comprising
   an alignment layer between the base layer and the lens layer.

9. The liquid crystal lens panel according to claim 8, wherein the alignment layer is a vertical alignment layer.

10. The liquid crystal lens panel according to claim 1, further comprising:
    two base layers facing to each other,
    wherein, on one surface of at least one of the base layers, an electrode layer is present, and the lens layer is disposed in contact with the electrode layer between the base layers facing each other.

11. The liquid crystal lens panel according to claim 1, wherein the liquid crystal molecule is a compound represented by Formula 1:

[Formula 1]

where A is a single bond, —COO—, or —OCO—, $R_1$ to $R_{10}$ are each independently hydrogen, a halogen, an alkyl group, an alkoxy group, an alkoxycarbonyl group, a cyano group, a nitro group, —U-Q-P or a substituent of Formula 2, provided that a pair of two adjacent substituents of $R_1$ to $R_5$ or a pair of two adjacent substituents of $R_6$ to $R_{10}$ are linked to each other, thereby forming the benzene substituted with —U-Q-P, where U is —O—, —COO—, or —OCO—, Q is an alkylene group or an alkylidene group, and P is an alkenyl group, an epoxy group, a cyano group, a carboxyl group, an acryloyl group, a methacryloyl group, an acryloyloxy group or a methacryloyloxy group:

[Formula 2]

where B is a single bond, —COO—, or —OCO—, $R_{11}$ to $R_{15}$ are each independently hydrogen, a halogen, an alkyl group, an alkoxy group, an alkoxycarbonyl group, a cyano group, a nitro group, or —U-Q-P, provided that two adjacent substituents of $R_{11}$ to $R_{15}$ are linked to each other, thereby forming a benzene substituted with —U-Q-P, where U is —O—, —COO—, or —OCO—, Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

12. The liquid crystal lens panel according to claim 1, wherein the lens layer further comprises a chiral agent.

* * * * *